June 25, 1935.   G. H. REID   2,006,112
GYROSCOPIC TURN INDICATOR
Filed July 20, 1932   2 Sheets-Sheet 1
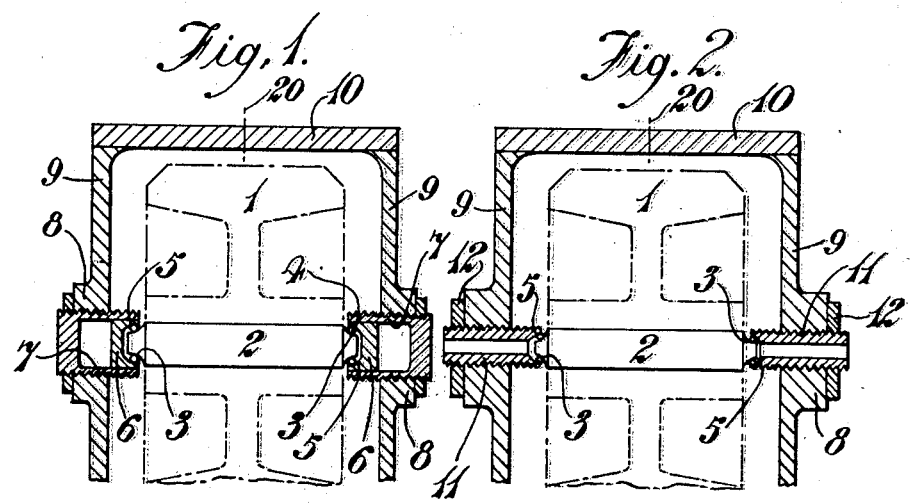
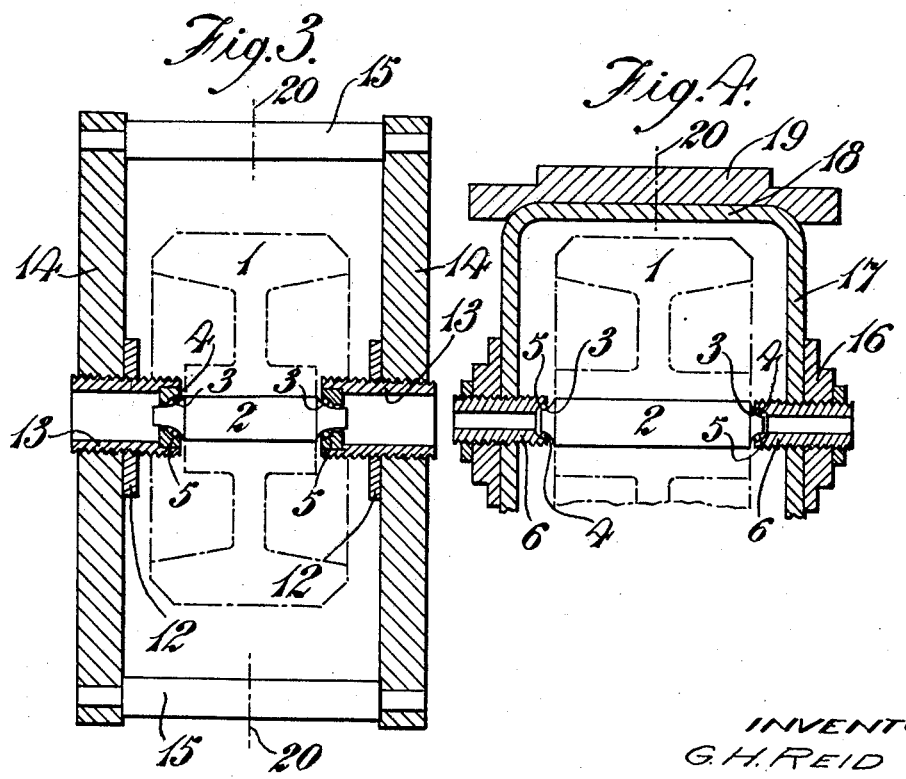
INVENTOR
G. H. REID
BY
ATTY.

June 25, 1935.  G. H. REID  2,006,112
GYROSCOPIC TURN INDICATOR
Filed July 20, 1932   2 Sheets-Sheet 2
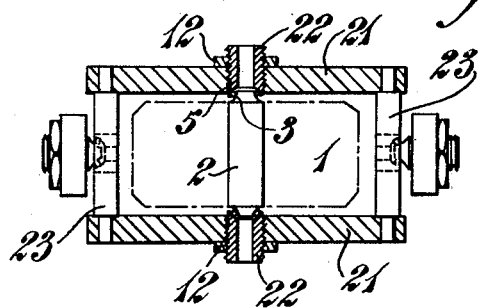
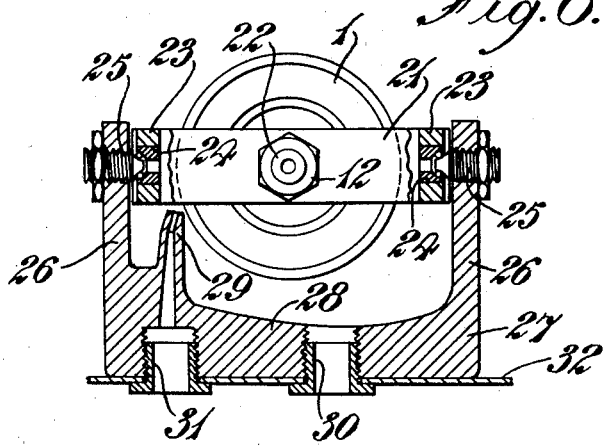
INVENTOR
G. H. REID
BY
ATTY.

Patented June 25, 1935

2,006,112

UNITED STATES PATENT OFFICE 2,006,112

GYROSCOPIC TURN INDICATOR

George Hancock Reid, Kingston-on-Thames, England

Application July 20, 1932, Serial No. 623,681
In Great Britain September 16, 1931

5 Claims. (Cl. 74—5)

This invention relates to gyroscopic turn indicators and like apparatus, particularly for use in aircraft.

An object of the invention is so to improve means for mounting gyroscopes for rate of turn indicators as to render them immune from any changes of temperature to which they are liable to be subjected whilst in use in aircraft.

A further object is to provide mountings which shall be suited to production methods and at the same time allow of a high degree of accuracy in function.

A further object is to provide an arrangement which permits of easy assembly of an instrument with working parts disposed in unit form.

A further object is to provide an assembly in which the gyroscope of a turn indicator may be constantly located relatively to an air jet by the medium of which said gyroscope is operated, and also wherein the centre of gravity of the gyroscope may be constantly located relative to certain axes despite temperature change.

It is to be appreciated that in dealing with gyroscopic apparatus such as rate of turn indicators for use in aircraft, very great pains have to be taken towards absolute precision; because it takes very little to render the operation of such instruments inaccurate, to diminish their utility, and maybe, to incur actual risk in practical use. This invention seeks to provide means for more nearly perfecting this class of instrument in view of the thermal and other difficulties encountered, without introducing complex or expensive features of construction.

According to this invention and with the above objects in view, mountings for gyroscopes have parts made and disposed of metals which prevent expansion and contraction due to changes of temperature from affecting adversely the function of bearings either of the gyroscope itself or of the usual gimbal in which the gyroscope is borne and which is itself carried in bearings. Further a member or frame carrying the gimbal is formed of a suitable metal in relation to the gimbal construction and is formed in such a way that the whole assembly of the gyroscope gimbal and frame, may form a unit capable of being separately assembled for building into an instrument and means are provided to ensure that full advantage is taken of this assembly towards accuracy and simplicity.

The invention will be described in relation to the drawings herewith in which:—

Figures 1, 2, 3 and 4 show various adaptations of the invention in so far as it relates to the construction of gimbals and gyroscopes in mutual relationship;

Figures 5 and 6 indicate how a gimbal and gyroscope may be assembled advantageously with a frame for the purpose of a unit construction, the principle of temperature correction being involved and also advantageous features of construction being shown.

In Figure 1 the gyroscope rotor is indicated diagrammatically in section at 1, and although it is probably most convenient to make this member mainly of brass, it is fitted with a spindle 2 having rotating bearing surfaces 3 at each end. The spindle in this case is of steel of suitable texture, for example, chromium steel, the co-efficient of expansion of which is known prior to use. The bearing surfaces at 3 co-operate through bearing balls 4 with stationary bearing surfaces at 5 formed in chromium steel plugs or bearing races 6 which are fixed within soft steel sleeves or race supports 7 attached by securing in bosses 8 provided in the longitudinal or side members 9 of a gimbal frame, of which the axial or end members 10 are of another chosen steel which, in this particular combination, is a high-carbon steel. In this example of the invention, expansions and contractions caused by changes of temperature to which the instrument may be subjected, take effect in that the spindle 2 will alter the distance between the bearing surfaces at 3. For precision of operation, it is desirable, therefore, that the axial alterations in distance between the bearing surfaces 5 are for any probable temperature change the same as those between the surfaces 3. To this end the particular combination of metals, for example, as above stated, is selected. It will be appreciated that if for a given change of temperature, the spindle 2 contracts by a given amount then the effective length of the part 10 will contract by another amount and the effective lengths of the supports 7 must contract by a third amount, and if this function is fulfilled the bearings may be arranged to remain unaffected by such change of temperature. The co-efficients of expansion of parts 2, 7 and 10 must therefore be suitably chosen to this end.

Figure 2 illustrates a slight variant from Figure 1 in which the spindle 2 and bearing surfaces 3 re-appear but in each case the bearing surfaces 5 are formed directly in chromium steel supports 11 threaded into the side members 9 of the gimbal in the bosses 8. The bearing supports 11 may be locked by brass nuts 12. In this case, the axially directed parts 10 of the gimbal are again of high carbon steel, the spindle is again of chromium steel and the supports 11 are of chromium steel. The disposition of metals and their effective lengths bear the same relation to their co-efficients of expansion and therefore the same compensation is afforded in this case as in the case of Figure 1.

Figure 3 presents a similarly functioning but constructionally different embodiment of the invention, in which the gyro 1 has a steel spindle 2 and bearing surfaces 3 as before but in this case the stationary bearings 5 are mounted in aluminium supports 13 preferably locked by brass nuts 12 mounted in aluminium side members or longitudinals 14 of the gimbal which has axial or end members 15 of brass.

In this case the effective overall length of the end members 15 is the same as that of the spindle 2 and bosses 13. The longitudinals 14 are chosen of aluminium for a purpose hereinafter specified.

Figure 4 shows a further variant in which the principle of the compound bar is adapted to afford the desired temperature compensation. Here again a rotor 1 has a spindle 2 and bearing surfaces 3 co-operating through balls 4 with bearing surfaces 5 formed in steel supports 6 which are mounted in suitable reinforcing or stiffening lugs 16 attached to the longitudinals 17 forming the sides of the gimbal and constructionally continuous with axial or end members 18. In this particular form the gimbal is adapted to be made for production, of sections of substantially rectangular-sectional drawn steel tube, this being desirable in manufacture. In order to compensate this particular constructional case adequately it is found desirable to attach tightly a saddle member 19 to the axially-directed member 18, the two parts 18 and 19 being of different steels, 19 having the greater co-efficient of expansion, or the part 19 may be of brass. The combination 18, 19 functions as the well-known "compound bar" so that on cooling the combination is slightly bowed whereby the bearing surfaces 5 are in effect spread further apart although there is of course overall contraction, and this is arranged to equalize the contraction between the bearing surfaces 3 of the spindle 2. This particular form of the invention has proved conspicuously successful in practice owing to easy productivity and the possibility of accurate compensation against temperature variation.

It will be noted that one of the objects which is achieved by any of the above combinations is that the gyroscope is not moved during expansion or contraction in any way which can displace its centre of gravity away from the gimbal axis which is diagrammatically represented in each case at 20. This is an important feature since there may be relatively obvious methods of allowing for length variation, such, for example, as the use of spring loaded bearings which may adequately allow the bearings proper freedom upon contraction taking place but would not ensure the constant positioning of the centre of gravity of the rotor within the gimbal.

It is also necessary that the rotor should be so held that the jet of air which is normally used for propelling it should impinge upon it in a constant and known manner and this can be achieved, together with further advantage, by the use of the construction described in relation to Figures 5 and 6. In these figures, 1 again represents the rotor, with steel spindle 2 and bearing surfaces at 3. The gimbal in this case comprises longitudinals 21 of aluminium, holding bosses 22 with bearing surfaces 5, which bosses may be locked with brass nuts 12; and at either end are axially directed members 23 of the same steel as the spindle 2 and bosses 22. Axial compensation is thus provided. The end members 23 carry bearing cups 24 which through balls co-operate with stationary bearing surfaces at 25 mounted each in an upstanding limb 26 of a frame member 27 which has a longitudinal part 28 integral with said limbs and in which is formed integrally a jet 29 and in which is fitted also an orifice fitting 30. A union jet fitting 31 and the orifice fitting 30 serve as a means for rigidly attaching the frame 27 to the casing 32 of the instrument, indicated diagrammatically. This construction, apart from being mechanically useful from the manufacturing point of view, has the advantage that interference with the proper settings of the rotor and gimbal bearings which might be caused by changes of temperature, is eliminated and the gyroscope is carried in constant relation to the gimbal axis and also to its driving jet. Moreover, the whole assembly can be removed as one unit without upsetting the bearings, and possible mechanical distortions of the casing of the instrument cannot distort or upset the frame 27 and consequently the bearings of the gimbal or rotor, so that change by an accidental blow etc. is a more remote possibility.

It will be appreciated that the invention in each form involves compensation for temperature change in an axial direction respective of the rotor and in some cases similar compensating longitudinally of the gimbal, to protect its bearings in a carrying frame, and also involves a construction allowing of certain accurate predeterminable relationships of parts and freedom from accidental displacement, all of which features tend to enhance the value and precision of the instrument. The invention may with but little modification be applied to gyroscopic instruments akin to rate of turn indicators without enlarging its scope.

I claim:—

1. A gyroscope of the type including a rotor shaft, bearing parts cooperating therewith, and a gimbal part for directly supporting the bearing parts, the shaft and bearing parts being of metal having the same coefficients of expansion but of different amounts of expansion incident to their respective lengths, the gimbal part being constructed of metal having such coefficient of expansion that the amount of expansion thereof will compensate for the difference in amounts of expansion of the rotor shaft and such bearing parts.

2. A gyroscope of the type including a rotor shaft, bearing parts cooperating therewith, and gimbal parts carrying the bearing parts, the rotor shaft and bearing parts being of relatively different lengths and constructed of metals having the same coefficients of expansion, whereby such rotor shaft and bearing parts expand to different amounts under temperature changes, the gimbal parts being constructed of a metal having such coefficient of expansion as to cause an amount of expansion thereof to compensate for the difference in amounts of expansion between the bearing parts and rotor shaft.

3. A gyroscope of the type including a rotor shaft, bearing parts cooperating therewith, and a support for the bearing parts, the bearing parts and shaft being constructed of metals having the same coefficients of expansion, the support being constructed of a metal having a different coefficient of expansion, the metals of the bearing parts and support having a total amount of expension corresponding to that of the shaft, whereby to maintain normal shaft bearing under varying temperature changes.

4. A gyroscope of the type including a support having side members and end members, bearing parts mounted in the side members, and a rotor shaft supported in the bearing parts, the bearing parts and shaft being constructed of metals having different lengths but the same coefficients of expansion, the different lengths of the bearing parts and shaft compelling different amounts of change in the lengths of such bearing parts and shaft under temperature changes, the end members of the support being of a metal having a coefficient of expansion to cause the side members of the support to move under temperature changes to compensate for the difference in amount of such changes in length between the bearing parts and shaft.

5. A gyroscope including a rotor shaft, end bearings therefor, sleeves carrying the bearings, and a support in which the sleeves are mounted, the sleeves and shaft being of metals of the same coefficients of expansion but subjected to different amounts of change under temperature variation incident to their relatively different lengths, the support being constructed of a metal of such coefficient of expansion that the amount of change in the support under temperature variation will compensate for the difference in amount of expansion between the shaft and sleeve.

GEORGE HANCOCK REID.